(12) United States Patent
Bladow

(10) Patent No.: US 6,175,770 B1
(45) Date of Patent: Jan. 16, 2001

(54) ELECTRONIC CONTROLLER HAVING AUTOMATIC SELF-CONFIGURATION CAPABILITIES

(75) Inventor: Craig W. Bladow, Perrysburg, OH (US)

(73) Assignee: Dana Corporation, Toledo, OH (US)

(*) Notice: Under 35 U.S.C. 154(b), the term of this patent shall be extended for 0 days.

(21) Appl. No.: 09/001,305

(22) Filed: Dec. 31, 1997

(51) Int. Cl.[7] .................................................. G05B 15/00
(52) U.S. Cl. .................................................. 700/2; 714/13
(58) Field of Search ................................ 700/86, 2, 3, 82, 700/11; 713/100, 1; 714/10, 12, 13

(56) References Cited

U.S. PATENT DOCUMENTS

| | | | |
|---|---|---|---|
| 3,828,325 | 8/1974 | Stafford et al. ........................ 710/63 |
| 4,435,763 | 3/1984 | Bellay et al. ........................... 703/27 |
| 4,450,521 | 5/1984 | McDonough et al. .................... 710/3 |
| 4,803,623 | 2/1989 | Klashka et al. .......................... 710/8 |
| 4,841,431 | * | 6/1989 | Takagi et al. ........................... 700/82 |
| 5,161,102 | | 11/1992 | Griffin et al. .......................... 710/104 |
| 5,274,767 | | 12/1993 | Maskovyak .............................. 710/16 |
| 5,353,432 | | 10/1994 | Richek et al. .......................... 710/10 |
| 5,444,644 | * | 8/1995 | Divjak .................................... 702/64 |
| 5,530,701 | | 6/1996 | Stillman et al. ....................... 370/410 |
| 5,551,066 | | 8/1996 | Stillman et al. ........................ 455/69 |
| 5,880,957 | * | 3/1999 | Aardema et al. ....................... 700/86 |
| 5,948,091 | * | 9/1999 | Kerigan et al. ....................... 710/129 |
| 5,980,078 | * | 11/1999 | Krivoshein et al. ..................... 700/1 |
| 6,052,803 | * | 4/2000 | Bhatia et al. ........................... 714/49 |
| 6,070,208 | * | 5/2000 | Brief .................................... 710/104 |

* cited by examiner

Primary Examiner—William Grant
Assistant Examiner—Chad Rapp
(74) Attorney, Agent, or Firm—MacMillan, Sobanski & Todd, LLC

(57) ABSTRACT

A network of electronic controllers adapted for controlling operation of a plurality of output devices. Each of the controllers is programmed with an algorithm which causes the controller to analyze its external connections to identify its assigned tasks and functions, thereby allowing the controller to automatically configure itself for use. Each of the controllers is programmed with instructions for performing the assigned tasks and functions of all of the controllers.

22 Claims, 3 Drawing Sheets

ELECTRONIC CONTROLLER HAVING AUTOMATIC SELF-CONFIGURATION CAPABILITIES

BACKGROUND OF THE INVENTION

This invention relates in general to networks of electronic controllers for controlling the operation of a plurality of output devices. In particular, this invention relates to improved structure for a network of electronic controllers in which each of the controllers is responsive to the environment in which it is located for automatically adopting a selected one of a plurality of operating programs stored therein for execution.

Electronic controllers are often used for controlling the operation of one or more output devices in response to one or more input conditions. A typical electronic controller contains an operating program that periodically samples electrical input signals that are representative of the various input conditions. When one or more predetermined input conditions have been satisfied, the electronic controller generates electrical output signals that control the operation of one or more of the output devices. When it is necessary to monitor a relatively large number of input conditions or to control a relatively large number of output devices, it is known to embody the electrical controller as two or more microprocessors (electronic controllers of relatively small computational or control capabilities) that are connected together in a network. The use of a plurality of relatively small microprocessors in lieu of a single relatively large electrical controller has been found to be advantageous for cost and other considerations.

For example, it is known to provide commercial and industrial vehicles with a plurality of hydraulic actuators that are adapted to perform a variety of specific tasks in response to various input signals. By way of illustration, a conventional garbage truck is usually provided with a plurality of hydraulically powered output devices, such as an arm adapted to reach out, grip, lift, and dump a garbage container into a storage hopper carried thereon. A variety of hydraulic actuators are necessary to perform these functions. In the past, the hydraulic actuators were manually operated by a driver of the vehicle. More recently, however, the operation of the hydraulic actuators is controlled by a network of microprocessors carried on the vehicle. Each of the microprocessors contains an individual operating program that is designed to monitor certain input conditions and, in response thereto, operate certain hydraulic actuators on the vehicle. A separate microprocessor may be provided for facilitating input and output communication with the driver of the vehicle. The network of microprocessors functions as a unit to control the operation of the various hydraulic actuators in a desired manner.

From time to time, individual microprocessors within such a network may fail and require replacement. Ideally, such replacement should be performed as quickly as possible to minimize the downtime of the vehicle. The process of physically replacing the microprocessor can be performed in a relatively quick and simple manner. However, it has been found that the further process of re-programming the new microprocessor to perform the specific tasks previously assigned to the failed microprocessor can be relatively time consuming and require the use of trained service personnel. The difficulty of this re-programming is further exacerbated when the microprocessors are carried on a vehicle that is located a great distance from trained service personnel. Thus, it would be desirable to provide an improved structure for a network of microprocessors that avoids this problem.

SUMMARY OF THE INVENTION

This invention relates to an improved structure for a network of electronic controllers adapted for controlling the operation of a plurality of output devices. Each of the controllers is programmed with an algorithm which causes it to analyze its external connections to identify its assigned tasks and functions, thereby allowing the controller to automatically configure itself for use. Additionally, each of the controllers is programmed with instructions for performing all the assigned tasks and functions of all of the controllers. As a result of this structure, a new controller when placed into the network automatically identifies and performs its assigned tasks and functions. The controller automatically loads the instructions (which are stored in the other controllers) necessary for operation. There is no need to reprogram the new controller when it is placed into the network. This invention also relates to the auto-configuration algorithm and to an electronic controller programmed with the algorithm.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
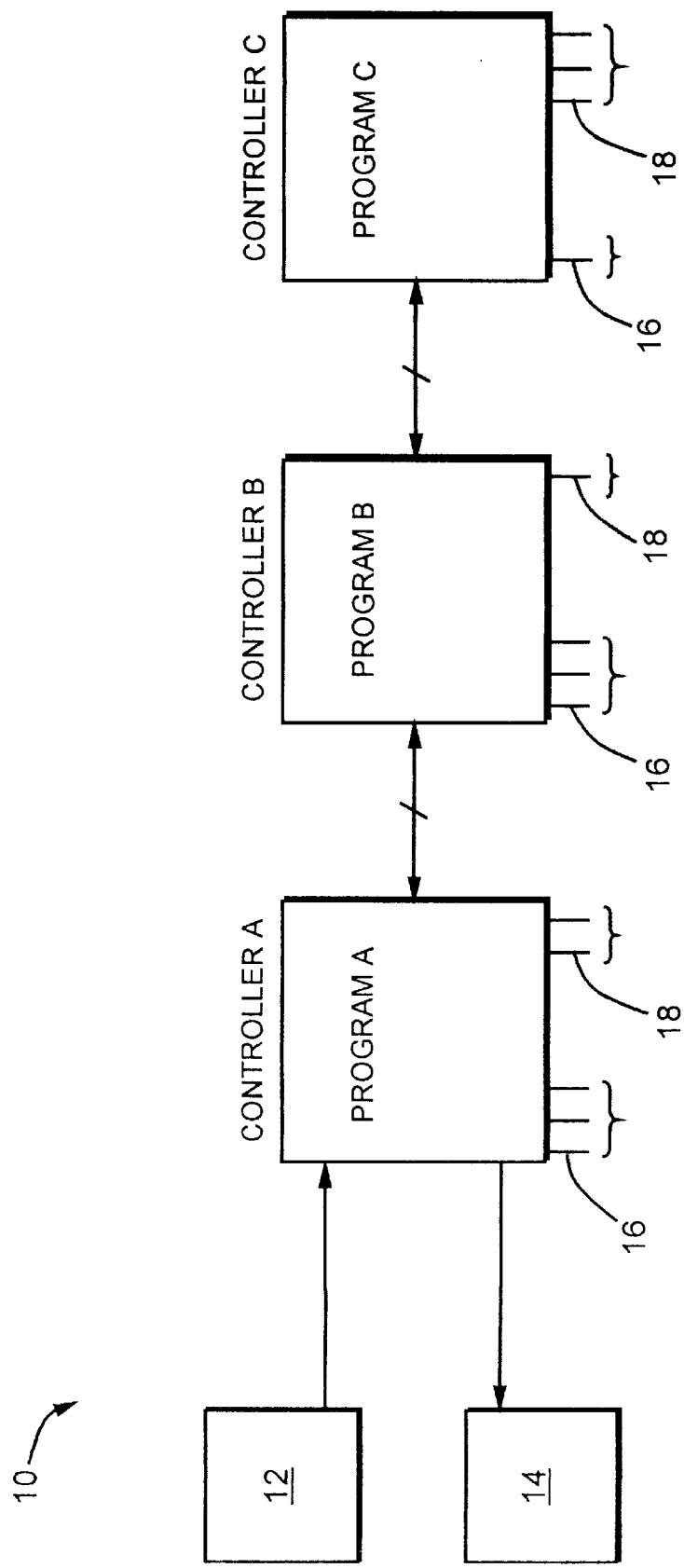
FIG. 1 is a block diagram of a prior art network of electronic controllers, wherein each of the electronic controllers has an individual operating program stored therein for execution.

Referring now to FIG. 1, there is illustrated a network, indicated generally at 10, of electronic controllers that is known in the art. The prior art network 10 includes three of such controllers that are identified as Controller A, Controller B, and Controller C, although any number of such controllers may be provided in the network 10. The controllers may be embodied as individual microprocessors or other conventional electronic controllers that are adapted to store and execute programs so as to operate one or more output devices in response to one or more input conditions. The prior art network 10 includes an input device 12 and an output device 14 that are connected to Controller A. The input device 12 may, for example, be embodied as a conventional keyboard, while the output device 14 may, for example, be a conventional visual display. The prior art network 10 may, for example, be used to control the operation of a plurality of hydraulic actuators carried on a commercial or industrial vehicle.

As shown in FIG. 1, Controller A includes one or more input ports 16 for receiving electrical input signals therein. The electrical signals can be provided from various conventional input sources, such as sensors, switches, and the like, that are representative of one or more operating conditions. Controller A further includes one or more output ports 18 for sending electrical output signals to respective controlled output devices. Controller B and Controller C include similar input ports 16 and output ports 18. The input ports 16 may vary in number from controller to controller as shown and usually are connected to provide electrical signals to the respective controllers from different input sources. Similarly, the output ports 18 may vary in number from controller to controller as shown and usually are connected to provide electrical signals from the respective controllers to different output devices.

Each of the controllers in the prior art network 10 has an operating program stored therein. Controller A has a first operating program identified as Program A stored therein, Controller B has a second operating program identified as Program B stored therein, and Controller A has a third operating program identified as Program C stored therein. Each of the operating programs is effective to periodically sample the electrical input signals provided to that individual controller and generate electrical output signals to the output devices controlled thereby.

Figure 2:
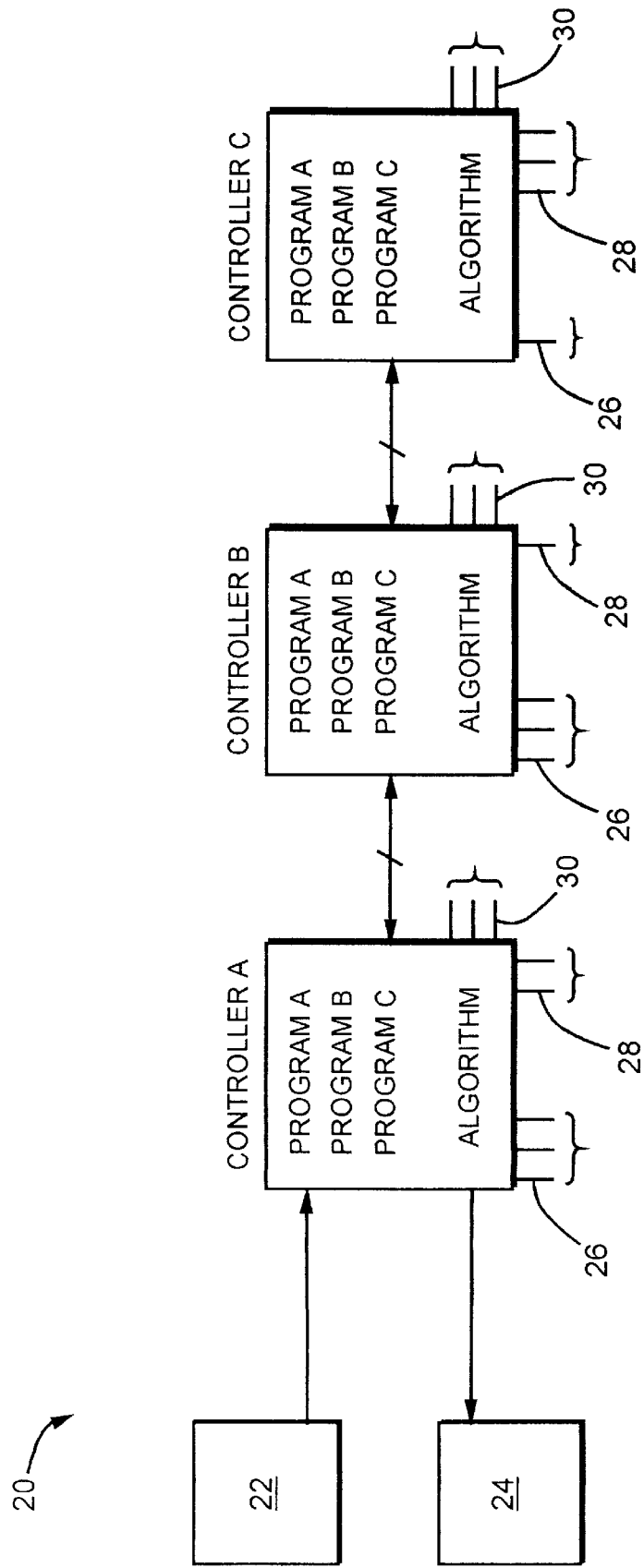
FIG. 2 is a block diagram of a network of electronic controllers in accordance with this invention.

Referring now to FIG. 2, there is illustrated a network, indicated generally at 20, of electronic controllers in accordance with this invention. The illustrated network 20 includes three of such controllers that are identified as Controller A, Controller B, and Controller C, although any number of such controllers may be provided in the network 20. The controllers may be embodied as individual microprocessors or other conventional electronic controllers that are adapted to store and execute programs so as to operate one or more output devices in response to one or more input conditions. The illustrated network 20 includes an input device 22 and an output device 24 that are connected to Controller A. The input device 22 may, for example, be embodied as a conventional keyboard, while the output device 24 may, for example, be a conventional visual display. The illustrated network 20 may, for example, be used to control the operation of a plurality of hydraulic actuators carried on a commercial or industrial vehicle.

As shown in FIG. 2, Controller A includes one or more input ports 26 for receiving electrical input signals therein. The electrical signals can be provided from various conventional input sources, such as sensors, switches, and the like, that are representative of one or more operating conditions. Controller A further includes one or more output ports 28 for sending electrical output signals to respective controlled output devices. Controller B and Controller C include similar input ports 26 and output ports 28. The input ports 26 may vary in number from controller to controller as shown and usually are connected to provide electrical signals to the respective controllers from different input sources. Similarly, the output ports 28 may vary in number from controller to controller as shown and usually are connected to provide electrical signals from the respective controllers to different output devices.

Each of the controllers in the illustrated network 20 has a plurality of operating programs stored therein. Preferably, each of the controllers in the illustrated network 20 has an operating program stored therein for not only itself, but additionally for each of the other controllers in the network 20. Thus, Controller A has a first operating program identified as Program A, a second operating program identified as Program B, and a third operating program identified as Program C stored therein. Similarly, Controller B has each of the operating programs Program A, Program B, and Program C stored therein, and Controller C has each of the operating programs Program A, Program B, and Program C stored therein. As discussed above, Programs A, B, and C are intended to respectively control the operations of Controllers A, B, and C to periodically sample the electrical input signals provided thereto and generate electrical output signals to the output devices controlled thereby.

This invention further contemplates that each of the controllers in the network 20 be programmed to automatically configure itself for operation, usually on startup of the network. In other words, each of the controllers in the network 20 contains an algorithm that causes it to identify its assigned tasks and functions and automatically adopt the appropriate one of the plurality of operating programs stored therein for execution. Once the appropriate operating programs have been adopted, the controllers operate in a normal manner to control the operation of the output devices in a desired manner.

To accomplish this, each of the controllers in the network 20 further includes one or more sensing ports 30, as shown in FIG. 2. The sensing ports 30 for each controller are adapted to be connected to one or more sensors (not shown) or other conventional means for detecting the presence of one or more input or output devices connected to that particular controller. By providing the controller with sufficient information regarding the number or type of these input or output devices, the controller can identify its assigned tasks and functions and automatically adopt the appropriate one of the plurality of operating programs stored therein for execution. The sensing ports 30 may, if desired, be embodied in the input ports 26 or the output ports 28 described above.

Figure 3:
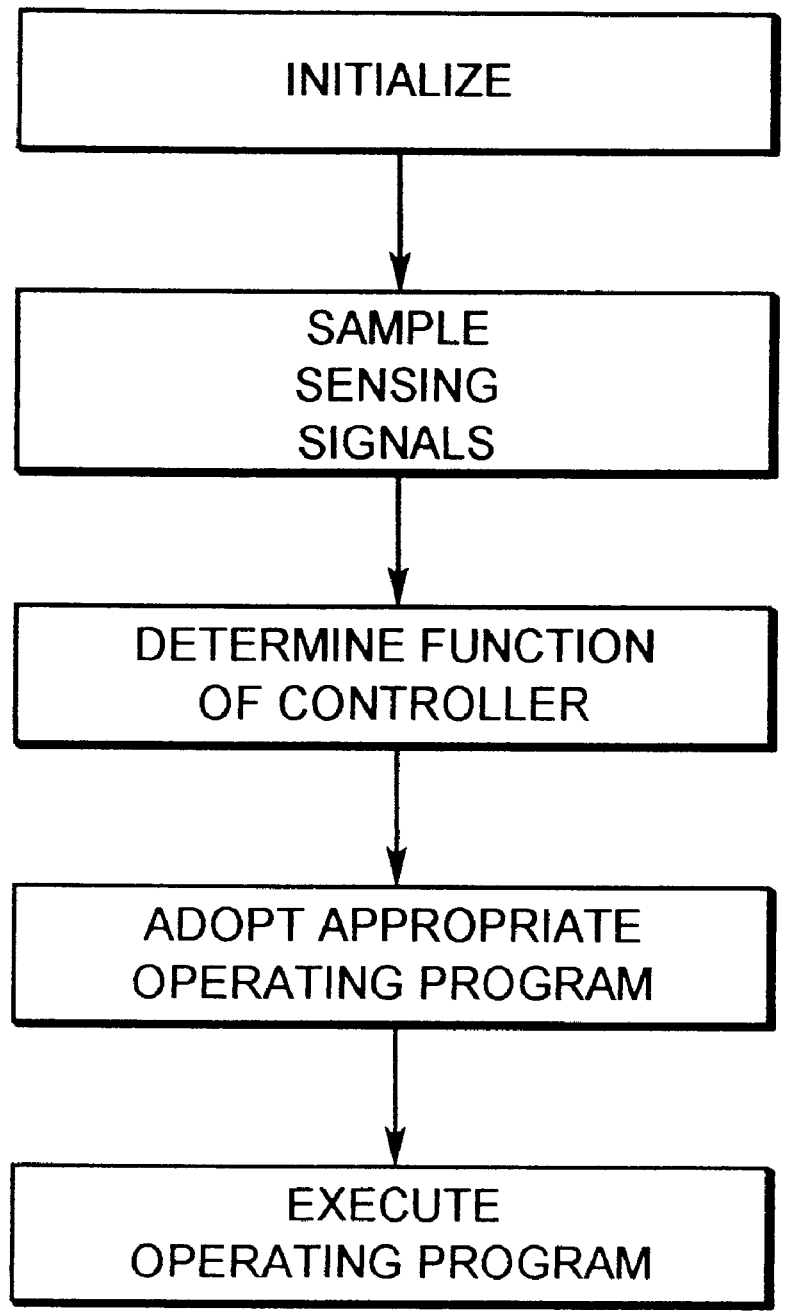
FIG. 3 is a simplified flow chart of an algorithm for determining the function of a controller in the network illustrated in FIG. 2 and for adopting and executing an appropriate one of a plurality of operating programs in response thereto.

The algorithm of this invention is illustrated in FIG. 3 in simplified form. As shown therein, the algorithm includes a first step wherein the controller performs its normal initialization functions when first turned on. Then, the algorithm enters a second step wherein one or more sensing signals from the sensing ports 30 are sampled. Based upon these sensing signals, the algorithm next determines the function of the particular controller. In response to this identification, the algorithm then automatically adopts the appropriate one of the plurality of operating programs stored therein and begins the execution thereof for normal operation.

The network 20 of this invention provides several advantages over the prior art network 10. Because each of the controllers in the network 20 contains all of the operating programs for all of the controllers, and further because each of the controllers is provided with an algorithm to identify its assigned tasks and functions, a new controller that is connected into the network 20 automatically identifies its assigned functions, adopts the appropriate operating programs, and performs its assigned tasks and functions without the need of trained service personnel. Alternatively, if the new controller does not contain the necessary operating program, such operating program can be downloaded from one of the other controllers in the network 20. Thus, new controllers need only be pre-programmed with the algorithm of this invention to identify its assigned functions and an algorithm to download that operating program from one of the other controllers in the network 20. Thus, it can be seen that the controllers are easily interchangeable within the network 20. This reduces the number of spare controllers to be inventoried by the user of the network.

An additional feature of this invention is that a new controller inserted in the network 20 with one or more updated operating programs, the entire network can automatically upgrade itself with these new operating programs. Additionally, because each of the controllers contains all the programs necessary to operate all the other controllers, if one controller goes bad and loses its memory (but does not require replacement), the other controllers can determine which controller is bad, and they can load the necessary programming into that controller. Default settings for a particular controller can be modified for customization. Updated settings are stored in the other controllers and downloaded into the new controller automatically. The addition of the auto-configuration algorithm to the controllers requires only a small amount of relatively simple programming.

The controllers in the illustrated network 20 may be embodied as individual microprocessors or other conventional electronic controllers that are adapted to store and execute programs so as to operate one or more output devices in response to one or more input conditions. The illustrated network 20 may, for example, be used to control the operation of a plurality of hydraulic actuators carried on a commercial or industrial vehicle. However, it is intended that the illustrated network 20 can be used in any environment to perform any desired functions in response to any desired input conditions.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A network of electronic controllers comprising a plurality of electronic controllers electrically connected to one another, wherein each of said controllers is programmed with an algorithm which causes said controller to analyze external connections of said controller to identify assigned tasks and functions of said controller, thereby allowing said controller to automatically configure itself for use, and wherein each of said controllers is programmed with instructions for performing assigned tasks and functions of all of said controllers, wherein updated instructions for performing assigned tasks and functions of all of said controllers are automatically loaded from a new controller which is added to said network into said remaining controllers.

2. The network defined in claim 1 wherein said controllers are interchangeable within said network.

3. The network defined in claim 1 wherein said instructions for performing assigned tasks and functions of all of said controllers are automatically loaded into a new controller which is added to said network from said remaining controllers.

4. The network defined in claim 1 wherein said controllers are adapted to determine when one of said controllers loses memory, and said controllers are adapted to load said instructions for performing assigned tasks and functions of all of said controllers into said controller with lost memory.

5. The method defined in claim 2 wherein said output devices are hydraulically actuated output devices on a vehicle.

6. The network defined in claim 1 wherein said external connections include connections to devices selected from input devices and output devices, and combinations thereof.

7. The network defined in claim 6 wherein said algorithm causes said controller to determine the number of said devices connected to said controller.

8. The network defined in claim 6 wherein said algorithm causes said controller to analyze voltage levels of said devices connected to said controller.

9. The network defined in claim 1 wherein said algorithm causes said controller to analyze whether a display device is connected to said controller.

10. A network of electronic controllers comprising a plurality of electronic controllers electrically connected to one another, wherein each of said controllers is programmed with an algorithm which causes said controller to analyze external connections of said controller to identify assigned tasks and functions of said controller, thereby allowing said controller to automatically configure itself for use, and wherein each of said controllers is programmed with instructions for performing assigned tasks and functions of all of said controllers, wherein said controllers are adapted to determine when one of said controllers loses memory, and said controllers are adapted to load said instructions for performing assigned tasks and functions of all of said controllers into said controller with lost memory.

11. The network defined in claim 10 wherein said controllers are interchangeable within said network.

12. The network defined in claim 10 wherein said instructions for performing assigned tasks and functions of all of said controllers are automatically loaded into a new controller which is added to said network from said remaining controllers.

13. The network defined in claim 10 wherein updated instructions for performing assigned tasks and functions of all of said controllers are automatically loaded from a new controller which is added to said network into said remaining controllers.

14. The method defined in claim 10 wherein said output devices are hydraulically actuated output devices on a vehicle.

15. The network defined in claim 10 wherein said external connections include connections to devices selected from input devices and output devices, and combinations thereof.

16. The network defined in claim 15 wherein said algorithm causes said controller to determine the number of said devices connected to said controller.

17. The network defined in claim 15 wherein said algorithm causes said controller to analyze voltage levels of said devices connected to said controller.

18. The network defined in claim 10 wherein said algorithm causes said controller to analyze whether a display device is connected to said controller.

19. A method of selecting one of a plurality of operating programs stored in an electronic controller for execution, said method comprising the steps of:
   (a) providing an electronic controller including a memory, a plurality of input ports adapted to be selectively connected to respective input sources, a plurality of output ports adapted to be selectively connected to respective output devices, and a plurality of sensing ports adapted to receive signals representing the presence of any of the input sources connected to the input ports or any of the output devices connected to the output ports;
   (b) storing a plurality of operating programs in the memory of the electronic controller;
   (c) sampling the signals supplied to the sensing ports; and
   (d) selecting one of the plurality of operating programs stored in the memory of the electronic controller for execution from the sampled signals.

20. The method defined in claim 19 wherein said step (d) is performed by determining the number of the input sources and the output devices connected to the sensing ports.

21. The method defined in claim 19 wherein said step (d) is performed by analyzing voltage levels at the sensing ports.

22. The method defined in claim 19 wherein said step (d) is performed by determining whether a display device is connected to the sensing ports.

* * * * *